United States Patent [19]

Hart et al.

[11] Patent Number: 5,422,134
[45] Date of Patent: Jun. 6, 1995

[54] GELLING AGENT

[75] Inventors: Robert J. Hart; William M. Marrs, both of Horsham; Judy A. White, Leicester; Iain C. M. Dea, Guilford, all of United Kingdom

[73] Assignee: CPC International Inc., Englewood Cliffs, N.J.

[21] Appl. No.: 169,691

[22] Filed: Dec. 17, 1993

[30] Foreign Application Priority Data

Dec. 18, 1992 [GB] United Kingdom ............... 9226392

[51] Int. Cl.⁶ .......................................... A23L 1/0526
[52] U.S. Cl. ..................................... 426/573; 426/575
[58] Field of Search ............... 426/573, 574, 575, 576, 426/577, 578, 579

[56] References Cited

U.S. PATENT DOCUMENTS

| | | | |
|---|---|---|---|
| 3,445,243 | 5/1969 | Moirano | 426/575 |
| 4,096,327 | 6/1978 | Guiseley | 426/575 |
| 4,200,661 | 4/1980 | Brigand et al. | 426/573 |
| 4,479,973 | 10/1984 | Halley | 426/573 |
| 4,826,700 | 5/1989 | Bayerlein et al. | 426/573 |

FOREIGN PATENT DOCUMENTS

| | | | |
|---|---|---|---|
| 457098 | 11/1991 | European Pat. Off. | A23L 1/307 |
| 2357188 | 2/1978 | France | A23L 1/04 |
| 1565006 | 4/1980 | United Kingdom | A23L 1/04 |

OTHER PUBLICATIONS

C. Rochas et al., "N.m.r. studies of synergistic kappa carrageenan–carob galactomannan gels", vol. 114, No. 6, 1990, Columbus, Ohio, Int. J. Biol. Macromol. Veg., vol. 12, No. 6, 1990, pp. 353–358.

B. V. McCleary, "Effect of Galactose Content on the Solution and Interaction Properties of Guar and Carbo Galactomannans", Carbohydratae Researach, vol. 92, 1981, pp. 269–285.

EPO Standard Search Report, File RS 91604 GB.

Primary Examiner—Jeanette Hunter
Attorney, Agent, or Firm—Brooks Haidt Haffner & Delahunty

[57] ABSTRACT

A gelling agent composition is provided which comprises depolymerized locust bean gum and a polysaccharide or mixture of polysaccharides capable of forming a gel in aqueous solution with locust bean gum. A method for producing the gelling agent and a comestible product containing it are also provided.

11 Claims, 1 Drawing Sheet

GELLING AGENT

BACKGROUND OF THE INVENTION

1. Field of Invention

Gelling agents are used in foods for a variety of purposes. As well as in familiar gelled foods, such as table jellies and similar desserts, confectionery jellies and jams, gelling agents are also valuable in meat products, and in the stabilization of emulsions in, for example, salad dressings.

2. Description of Related Art

There are two major types of food gel: those which set reversibly on cooling, and those which set irreversibly on heating. The former rely mainly on polysaccharide gelling agents, such as carrageenan, while the latter typically involve proteins, such as egg-white. Gelatin is an unusual gelling agent in that, although it consists of a mixture of proteins, its behavior is more typical of that of polysaccharides. Thus, gelatin solutions set to gels on cooling and these can be re-melted on heating.

This invention is concerned with gels which set reversibly on cooling.

A range of gelling agents is available to the food-manufacturing industry, and the selection of a suitable gelling agent for a particular application depends on many factors. Gelling agents differ in price, availability and usage rate, and also in the conditions under which they can be used and, therefore, the types of food in which they may be suitable. For example, native citrus pectin (with a high methyl ester content) forms a clear gel in the presence of acid and high concentrations of sugar, and is therefore exploited in jams and fruit jellies. Low methoxy pectin can be made to gel in the presence of calcium ions and does not require the presence of sugar; it is therefore suitable for use in reduced calorie products.

Despite this variety of gelling agents, gelatin remains unique because of its melting behavior. Gelatin gels melt at around 30°–35° C., which is below body temperature (37° C.). Thus gelatin gels melt in the mouth, and this property has implications for improved flavor release as well as texture. The approximate melting properties of some polysaccharide-type gels are shown below.

| Melting Properties of Polysaccharide-Type Gels | |
| --- | --- |
| Gelling Agent | Melting Temperature °C. |
| Cornstarch | 96 |
| Kappa-carrageenan | 65 |
| Alginate | 100 |
| Low Methoxy Pectin | 65 |
| Gelatin | 30–35 |

Another unusual feature of gelatin is that it is derived from animal sources (usually bones or hides), rather than from plants or seaweed or by bacterial fermentation. For food use, this is unacceptable to vegetarians. Furthermore, certain ethnic and religious groups cannot consume pork or pig products and may avoid any gelatin-containing food where the source of the gelatin is not specified as non-porcine. Gelatin is also an expensive product and forms gels only at relatively high concentrations. There is, thus, a need for a gelling agent which has the gelling properties of gelatin, which is capable of producing gels having melting properties similar to those of gelatin gels but which is derived from a non-mammalian source and which is capable of forming gels at low usage levels.

Xanthan is a high molecular weight polysaccharide by fermentation of the bacterium *Xanthomonas campestris*. Its high viscosity in aqueous solution is exploited by the food industry, particularly in the stabilization of emulsions, and in the oil industry in the production of drilling muds. Although xanthan solutions have a yield stress at zero shear rate, they will flow as viscous liquids if this stress is exceeded; thus, they do not form true gels. Xanthan has a cellulosic backbone, comprised of $\beta$1,4-linked glucose residues. To alternate glucose units is attached a trisaccharide sidechain containing a mannose, a glucuronic acid, and a second mannose residue. The first mannose is acetylated, while approximately half of the terminal mannose residues of the sidechains contain a pyruvate substituent. The pyruvate content of food-grade xanthan forms a part of its legal definition in the USA and the EC.

Locust Bean Gum (LBG; also known as Carob, or Carob Gum) is a polysaccharide derived from the endosperm of the Locust Bean (*Ceratonia siliqua*), which grows in Mediterranean regions. It is employed by the food industry as a thickener/stabilizer, for example in ice cream, but it too does not form gels on its own. LBG is a galactomannan, having a backbone consisting of $\beta$1,4-linked mannose residues with single $\alpha$-1,6-linked galactose side units.

LBG does, however, interact with some other polysaccharides to give valuable synergistic effects. Thus, the seaweed polysaccharides, kappa-carrageenan and agar, which are exploited as gelling agents by the food industry, form stronger gels if mixed with LBG. Replacement of 50% of the carrageenan with LBG gives a stronger gel with a more elastic texture, and, depending on the relative prices of kappa-carrageenan and LBG at any given time, may give significant cost savings.

LBG also interacts with xanthan. In this case, although neither of the polysaccharides gels on its own, the mixture of the two forms a strong, rubbery gel. Again, the fact of gelation when mixed with LBG forms a part of the legal definition of food-grade xanthan in the USA. The interaction, and therefore the gelation of the mixture, is believed to involve unsubstituted (i.e., galactose-free) regions of the LBG galactomannan aligning themselves with the cellulose backbone of the xanthan to create a three dimensional polysaccharide network (Dea et al, 1972; McCleary, 1979). Xanthan/LBG gels, however, have a melting temperature far in excess of the melting temperature of gelatin gels, and typically in the range of from 50°–60° C. depending on the method by which the xanthan-producing organism, *Xanthomonas campestris*, has been treated to yield the xanthan. Gels produced using the xanthan/LBG system have an unpleasant rubbery and elastic texture.

Other mixtures of polysaccharides are known to form gels in aqueous solution. Examples of such mixtures include blends of alginate with pectin and of konjac mannan with agar, kappa-carrageenan or xanthan. As in the case of xanthan/LBG gels, however, the melting temperature of the resulting gels is significantly higher than that of gelatin gels and they cannot be used to form so-called melt-in-the-mouth gels.

In the production of polysaccharides (or gelatin) for use as gelling agents (or thickeners) great efforts are generally made to preserve, as far as possible, the high molecular weight of the polymers involved. In general, the reduction of the molecular size of such a polymer causes a deterioration in the gel strength obtained (or, in the case of a thickener, in the viscosity achieved) and, as a consequence, a loss in commercial value. We have, however, discovered that by reducing the molecular size in certain polysaccharide systems not only is there a fall-off in gel strength obtained but also, surprisingly, a lowering of the melting temperature of gels produced is achieved. Furthermore, the decrease in molecular size also causes a favorable decrease in the elasticity of the gels.

Hence, by the present invention, commercially useful polysaccharide gelling agents are obtained which are capable of producing gels having desirable melt-in-the-mouth properties, including gel strengths and elasticity similar to those of gelatin gels.

SUMMARY OF THE INVENTION

Accordingly, the present invention provides a gelling agent composition comprising depolymerized locust bean gum and a polysaccharide or mixture of polysaccharides capable of forming a gel in aqueous solution with locust bean gum.

The present invention also provides a comestible product comprising a gelling agent composition of the invention. The gelling agent composition may be present in the comestible product in amounts up to 1.5% by weight (e.g., from 0.3 to 1.3% by weight). Preferably, the foodstuff, when gelled, melts at a temperature of from 0° to 45° C. (e.g., from 10° to 45° C.), more preferably from 10° to 40° C. (e.g., 25° to 35° C.).

In a further aspect, this invention provides a method of producing a gelling agent composition comprising the steps of:

(i) depolymerizing locust bean gum; and
(ii) adding the depolymerized locust bean gum of step (i) to a polysaccharide or mixture of polysaccharides capable of forming a gel in aqueous solution with locust bean gum.

DETAILED DESCRIPTION OF THE INVENTION

The gelling agent compositions produced by the method of the present invention comprise LBG which has been depolymerized by reducing its molecular weight. The modification of molecular weight of the LBG is believed to provide the reduction in the melting point of the resulting gel. The nature and degree of depolymerization of LBG required in any given case will depend upon the melting point of the gel formed by unmodified LBG with the polysaccharide or polysaccharide mixture and the molecular weight of the polysaccharide or polysaccharide mixture. The intrinsic viscosity of the depolymerized LBG in the compositions of this invention is preferably in the range of from 1.0 to 3.0 dl/g, more preferably 1.3 to 2.3 dl/g. However, the most preferred value for the intrinsic viscosity of the depolymerized LBG to form a melt-in-the-mouth gel with xanthan is about 2.1 dl/g for Rhodigel xanthan and about 1.5 dl/g for Keltrol xanthan illustrating that the source of the xanthan used affects the required intrinsic viscosity of the depolymerized LBG.

The polysaccharides which may be used in the compositions and method of the present invention are any polysaccharides or mixtures of polysaccharides which are capable of forming a gel with LBG (undepolymerized) in aqueous solution. Single polysaccharides (e.g., xanthan, agar or kappa-carrageenan) may be used in the invention or a mixture of polysaccharides may be used.

The melting points of the gels formed by the mixture of LBG with the polysaccharide or polysaccharide mixture are lowered (e.g., to form melt-in-the-mouth gels) by reducing the molecular weight of the LBG. The skilled person is readily able to tailor the molecular weights of the LBG to form a composition which is capable of forming a low melting gel.

The term depolymerization as used herein means a reduction in the molecular weight of the natural substance by the breaking of bonds in the polysaccharide main chain to produce a range of shorter chains which are substantially chemically identical with the native material other than in molecular weight. The depolymerized material may have a single broad distribution of molecular weights. Depolymerization may be effected in a number of ways such as by means of a chemical treatment or a physical treatment or by a mixture of such treatments to bring about cleavage of the polymer. Depolymerization may take place through a random or a chain process. It has been found that the molecular weight distribution of the depolymerized LBG (and, therefore, its method of depolymerization) affects the properties of the gels formed with other polysaccharides.

The methods by which depolymerization of the polysaccharide may be achieved include chemical hydrolysis, enzymatic processes, ultrasonication and treatment with ionizing radiation. A standard chemical technique that may be used to bring about depolymerization of LBG is the oxidation-reduction depolymerization (ORD) process which involves the generation of hydroxyl radicals in a solution of the polymer by the interaction of ferrous ions, oxygen and ascorbic acid, in the presence of a chelating ligand such as ethylenediamine tetraacetic acid (EDTA). Typically, according to this technique, a solution of LBG is mixed with a reagent solution containing ferrous sulphate, ascorbic acid and EDTA disodium salt and stirred at room temperature. After a period of time, the mixture is treated with a cation-exchange resin to remove ferrous ions in order to halt the hydrolysis reaction, filtered and then treated, for instance with propan-2-ol to precipitate the depolymerized LBG.

A preferred method of depolymerizing LBG that can be used in the present invention involves enzymatic depolymerization. A galactomannan enzyme, such as β-mannanase derived from *Aspergillus niger*, which attacks the polysaccharide backbone of LBG is a good alternative to the standard chemical depolymerization described above. As might be expected, the spread of different molecular weight species in the depolymerized product, i.e., the molecular weight profile, obtained by an enzymatic method is different from that obtained by the standard chemical method. The extent of depolymerization of the polysaccharide, i.e. the molecular weight profile of the depolymerized product, is controlled by time/temperature and enzyme concentration, and can be monitored by determining the intrinsic viscosity of the depolymerized product.

As is well-known, the properties of some polysaccharide gels are influenced by the addition of cations to the system. The properties of carrageenan/LBG gels, for example, are altered by the addition of cations (e.g., potassium ions) to the system. Similarly, the properties of the depolymerized LGB/polysaccharide gels of the present invention are altered by the addition of cations where the polysaccharide is kappa-carrageenan, for example. In such cases, the skilled person is readily able to determine the amount of cation which is needed to attain the desired gel properties for a given system.

The amounts of depolymerized LBG and polysaccharide in the gelling agent of the present invention, as might be expected, influence the gel characteristics of the gel obtained. Typically, the weight ratio of depolymerized LBG to polysaccharide may be in the range of from 4:1 to 1:4. For a good compromise between the various gel properties and mouthfeel of the resultant gel, a weight ratio of depolymerized LBG to polysaccharide of from 2:1 to 1:2 is preferred. The gel strength may be controlled to desired levels by varying the total polysaccharide concentration employed.

The gelling agent compositions of the present invention have wide application and may advantageously be used in a variety of food compositions. Examples of such foods include table jellies and gelled desserts and puddings, confectionery, fruit preserves, salad dressings and meat products. Delivery systems for pharmaceutical preparations such as capsules, gels and suppositories, etc. may also utilize the gelling agents of the present invention instead of gelatin. Typically, in a food composition the gelling agent composition will be used in a concentration of from about 0.3 to 1.3%, preferably at about 0.5%. Of course, the actual concentration required to produce a gel of desired gel strength, elasticity etc. will depend on the relative amount of reduced molecular weight polysaccharide and the nature and relative amount of unmodified polysaccharide in the composition and on their intrinsic viscosities. The invention will now be described with reference to the following illustrative examples, which are not intended to be limiting.

EXAMPLES

Materials

Locust bean gum (LBG) was obtained from Sigma (G0753) and PFW (UK) Ltd. (Hercogum NI, P O Box 18, 9 Wadsworth Road, Greenford, Middlesex UB6 7JH).

The depolymerized LBG samples were produced by the following procedures:

(i) oxidative-reductive depolymerization using a range of reagent concentrations and reaction times;

(ii) enzymatic degradation using beta-mannanase; and (iii) degradation by gamma irradiation.

Samples of food-grade xanthan were obtained from the following manufacturers:

1. Keltrol from Kelco International Limited, Westminster Tower, Albert Embankment, London SEI 7RZ 2. Rhodigel from Rhone-Poulenc, Rhone-Poulenc Chimie, Secteur Specialites Chimiques, Specialites de Formulation, Cedex No 29-F-92027, Paris - La Defense, France.

Methods

Measurement of Intrinsic Viscosity

Stock solutions of LBG and chemically depolymerized LBG were prepared in distilled water by dispersion, hydration and boiling. These were filtered through glass wool and used to prepare more dilute solutions covering a range of concentrations. The viscosities of these dilute solutions were measured using 'B' grade U-tube viscometers at 25° C. The fall-time data was used to calculate the reduced viscosity for each dilution which, when plotted against concentration, allowed the intrinsic viscosity in the limit of zero concentration to be calculated in dl/g. The intrinsic viscosity for some samples was measured using the Kramer method in which the log of the relative viscosity divided by concentration is plotted against concentration. Both plots should intercept the y-axis at the same value for the intrinsic viscosity.

Gel Preparation

Stock solutions of xanthan gum (0.5%) and locust bean gum (0.5%) were prepared by dispersing the hydro-colloid in distilled water at room temperature. After hydration, the xanthan solution was stirred for approximately 1 hour then fully dispersed using an Ultraturrax homogeniser. The LBG solution was also dispersed using an Ultraturrax and boiled to fully hydrate.

For preparation of mixed gels, the xanthan and LBG stock solutions were heated separately to 90°–95° C. and then mixed in the required ratio to give 100 ml samples in screw cap glass jars (capacity 120 ml). The hot solutions were mixed thoroughly, cooled to room temperature and gelled at 10° C. for 18 hr.

Gel Properties

Gel properties were measured using a Stevens LFRA Texture Analyser fitted with a large hemispherical probe (12.5 mm diameter and 35 mm in length) programmed to penetrate 35 mm into the gel at 0.5 mm/sec. Load/penetration curves were produced on the chart recorder and used to find Break Load, Elastic Limit and Rigidity (Break Load/Elastic Limit).

Melting-Point Determinations

Falling-drop method: This method is based upon the British Standard (BS 757:1975) procedure for the determination of the melting point of gelatin. After the hot xanthan and LBG solutions had been mixed, 5 ml samples of gel were formed at 10° C. for 18 hours in a test-tube positioned at an angle of 45° in a purposebuilt test-tube rack. The test tubes were then rotated so that the gel surfaces became vertical and a 200 microlitre aliquot of red dye (Oil Red 0 in carbon tetrachloride) was placed at the angle between the gel and the tube. The test tube rack containing the gel tubes was placed in a glass-fronted water bath at 13°–15° C. and the gel samples heated at approximately 1° C./min. The melting point of the gels was taken to be the temperature at which the drop of red dye fell through the sample to the bottom of the tube. For gels prepared at 1% total concentration, the fall of the drop was impeded by the high viscosity of the sample. The melting point was taken to be the temperature at which the vertical meniscus became level.

Inverted Vial Method: After the hot xanthan and LBG solutions have been mixed, 1 ml samples are placed into 2 ml glass screw cap vials in duplicate. The gels are allowed to set at 10° C. for 18 hours. The duplicate vials were then inverted into a test tube containing water at 10° C. A test tube rack containing the gel tubes was placed in a glass fronted water bath at 10"C and the gel samples heated at approximately 1° C./min. The melting point of the gels was taken to be the temperature at which the gel melted and flowed downwards.

CarriMed Rheometer method: A small volume (4.3 ml) of hot sample was placed on the rheometer plate which had been pre-heated to 60° "C., and the cone (6 cm diameter, 4°) was brought into position. A small torque was applied to center the sample between were then subjected to an the cone and plate. Samples oscillating stress input using a frequency of 0.7 Hz and a constant low strain of 0.05. Under these conditions, the gel structure is unperturbed by the stress applied. The following experiments were carried out:

(a) Temperature sweep, 70°–5° C.
(b) Time sweep, at 5° C., for 30 minutes
(c) Temperature sweep, 5°–70° C.

The storage modulus G' and loss modulus G" were measured as a function of temperature (cooling and heating) and time. Melting points were determined from the G'/temperature curves being the temperature at which the G' values had fallen to that of the fully melted sample.

Brookfield Viscosity Test for Xanthan

The standard viscosity test for xanthan was performed according to the Code of Federal Regulations - 21 Food and Drugs - Revised as of Apr. 1, 1988. The test essentially involves the preparation of a 1% (m/m) solution of the xanthan gum in 1% KCl solution. The xanthan gum and salt were pre-mixed before addition to the distilled water. The mixture was stirred for 2 hours, equilibrated at 24° C. and the viscosity (in centipoises) determined using a Brookfield Viscometer LVT fitted with spindle No 3 at 60 rpm. The same xanthan solutions were then equilibrated at 66° C. for 45–60 minutes and the viscosity measured again. The ratio of the viscosities at the two temperatures was determined and compared with the specified ratio of 1.02–1.45.

Results

Intrinsic viscosities of depolymerized locust bean gum

Figure 1:
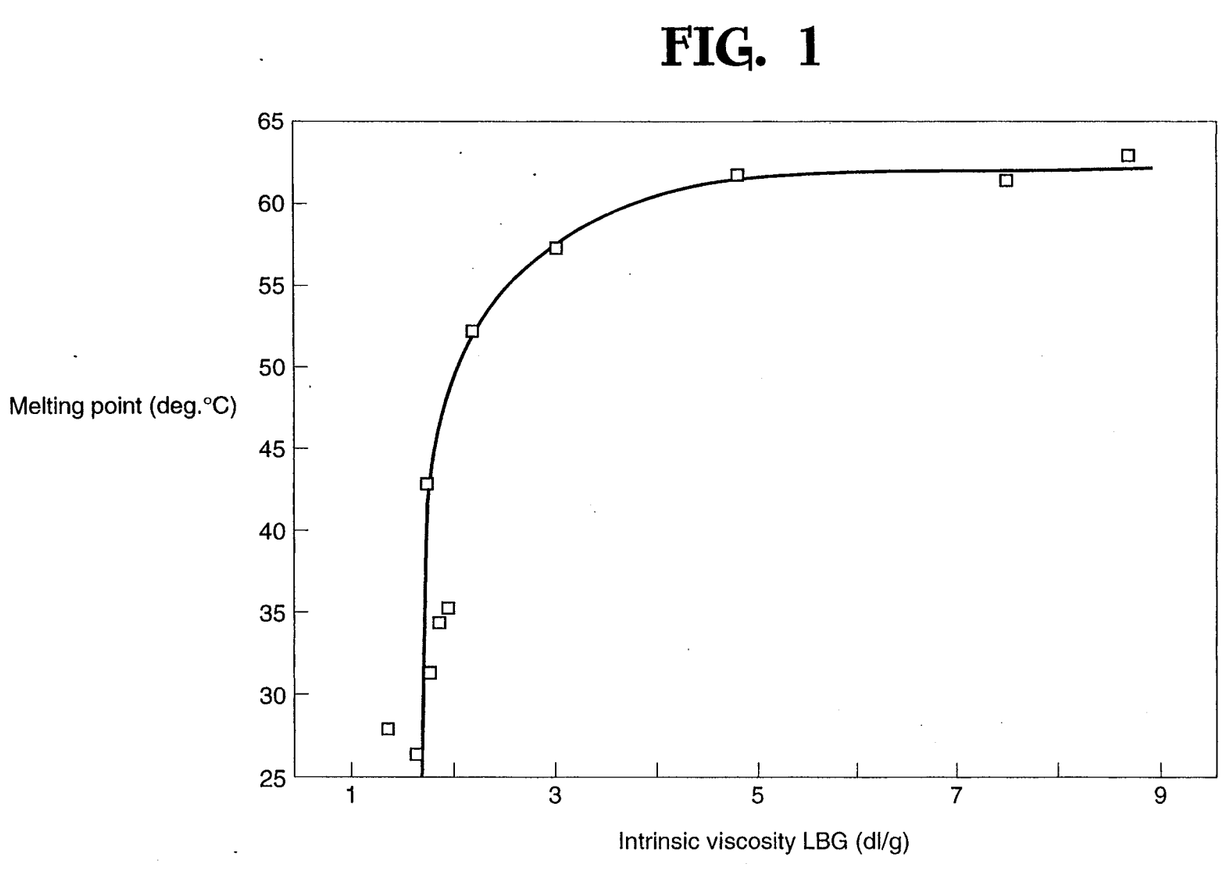

The intrinsic viscosities of LBG and melting points (CarriMed) of the gels formed by xanthan and depolymerized LBG are shown in Table 1 together with Newtonjan Viscosity Coefficients for comparison. The intrinsic viscosities calculated using the standard and Kramer methods are designated (1) and (2) in the Table. The intrinsic viscosities are directly related to the molecular size of the depolymerized material and the values calculated by the two methods agree well. The melting points of the xanthan/LBG gels decreased with decreasing intrinsic viscosity. Melt-in-the-mouth behavior corresponded with an intrinsic viscosity of around 2 dl/g. The dependence of melting point on intrinsic viscosity is shown in FIG. 1.

TABLE 1

| Viscosity Measurements of Depolymerized LBG | | | | |
|---|---|---|---|---|
| Depoly. conditions [Reagent]/Time | Newtonian Viscosity Coefficient (mPa · s) | Intrinsic Viscosity 1 (dl/g) | Intrinsic Viscosity 2 (dl/g) | M. Pt Carri-med (°C.) |
| 2 × standard/3 min | 5.1 | 1.9 | 2.0 | 34.8 |
| 2 × standard/3 min | 5.3 | 1.9 | 2.0 | 35.7 |
| 20 × standard/3 min | 4.6 | 1.4 | 1.4 | 28.0 |
| 20 × standard/3 min | 3.9 | 1.7 | 1.7 | 26.4 |
| 16 × standard/3 min | 4.8 | 1.8 | 1.8 | 43.1 |
| 16 × standard/3 min | 3.8 | 1.8 | 1.8 | 31.7 |
| standard/3 min | 6.8 | 2.2 | N.D. | 52.1 |
| 0.5 × standard/30 min | 12.4 | 3.0 | N.D. | 57.0 |

TABLE 1-continued

| Viscosity Measurements of Depolymerized LBG | | | | |
|---|---|---|---|---|
| Depoly. conditions [Reagent]/Time | Newtonian Viscosity Coefficient (mPa · s) | Intrinsic Viscosity 1 (dl/g) | Intrinsic Viscosity 2 (dl/g) | M. Pt Carri-med (°C.) |
| Control | 1190.0 | 8.7 | N.D. | 62.8 |

N.D. = Not determined
Viscosity data relates to depolymerized LBG

Melting point data is for a gel formed by the depolymerized LBG with xanthan, 1:1 ratio degraded LBG:xanthan, 0.5% (w/w) total polysaccharide.

A chemically depolymerized LBG which produced a melt-in-the-mouth gel with a melting point of 35.7° C. with Kelco xanthan at a ratio of 1:1 (final concentration 0.5%) was used to prepare a further gel with Kelco xanthan at a ratio of 3:1. The gel properties (Table 2) suggest that optimum gel strength is obtained with LBG in excess, contrary to the behavior shown by the gels formed with native LBG. The melting point, on the other hand, is only slightly affected by composition.

TABLE 2

| Properties of 0.5% depolymerized LBG/xanthan (Keltrol) gels | | | | |
|---|---|---|---|---|
| Composition (LBG:xanthan) | Break Load (g) | Elastic Limit (mm) | Gel Rigidity (g/mm) | Melting Point (°C.) |
| 3:1 | 33.6 | 12.5 | 2.7 | 38.6 |
| 1:1 | 17.4 | 17.9 | 1.0 | 35.7 |

Mixed gels were prepared using the untreated polysaccharide and depolymerized LBG and gel properties and melting behavior observed. In general, gels were prepared containing 0.25% (w/w) of each polysaccharide. Gels were characterized using a Stevens-LFRA Texture Analyser fitted with a 12.5 mm hemispherical probe programmed to penetrate the gel 35 mm at a speed of 0.5 mm per second. The load experienced by the plunger was continuously recorded.

Three properties were observed; the break-load (i.e., the load at gel rupture), the elastic limit (i.e., the distance travelled by the plunger at this point) and the gel rigidity (break-load divided by elastic limit). Melting of the gels was assessed either organoleptically for melt-in-the-mouth gels (i.e., melting points less than about 37° C.) or by using the rheometer in the "Oscillation" mode, using a cone-and plate geometry (6 cm: 4 degree cone). Measurements of G' (the storage modulus) and of G" (the loss modulus) of the gels were made as a function of temperature. The melting point was defined as the temperature at which G' became less than G".

EXAMPLE 1

LBG (60 g) was dispersed in distilled water (6 l) at room temperature, allowed to hydrate and heated to approximately 80°–90° C. for 15–20 min with stirring. An equal volume of ORD reagent solution containing ferrous sulphate (9.36 mM), disodium EDTA (4.64 mM) and ascorbic acid (93.2 mM) was added and the mixture stirred at room temperature for 3 minutes. These ORD reagent concentrations are equivalent to 2 x standard as referred to in the Tables. Strong cation-exchange resin (600 g: Amberlite IR-120P, sodium form) was added and the mixture stirred for 3 min. The ion-exchange resin was removed by filtration and the treated LBG precipitated by the addition of propan-2-ol (36 l), filtered, air-dried and milled. 47.7 g of depolymerized LBG was obtained.

A 1% (w/v) aqueous solution of this depolymerized LBG exhibited practically Newtonjan behavior, with a viscosity of 5.05 mPa.s.

A gel was prepared by mixing a solution (0.5 w/w) of this material with an equal volume of a solution (0.5% w/w) of xanthan. The gel was matured at 10° C. overnight before testing as described above. Gel properties were as follows:

| | |
|---|---|
| Break Load | 18.2 g |
| Elastic Limit | 16.2 mm |
| Gel Rigidity | 1.12 g/mm |
| Melting Point | 34.8° C. |

EXAMPLE 2

Further variations on the procedure of example 1 were performed using a range of concentrations of reagents, and of reaction times.

Two further samples of depolymerized LBG were prepared by gamma-irradiation of the dry powder. Doses of 2.3 and 11.1 kGy were employed.

The viscosities and gel properties of all these materials are summarized in Table 3. Samples which were only slightly hydrolysed deviated significantly from Newtonian behavior; for these, the calculated Casson viscosities have been quoted.

TABLE 3

Viscosity and Co-Gelling Properties of Depolymerized LBG

| [Reagent]/Time/min | Viscosity (mPa·s) | Break Load | Elastic Limit | Gel Rigidity | Melting Point |
|---|---|---|---|---|---|
| Control Gel | 1190* | 265 | 34.1 | 7.8 | 62.8 |
| 2 × standard 3 min | 5.05 | 18.2 | 16.3 | 1.1 | 34.8 |
| repeat | 5.06 | 9.4 | 17.5 | 0.5 | 32.6 |
| repeat | 5.61 | 14.5 | 18.8 | 0.8 | 31.0 |
| repeat | 5.25 | 17.4 | 17.9 | 1.0 | 35.7 |
| standard 3 min | 6.81 | 70.8 | 23.4 | 3.1 | 52.1 |
| 0.5 × standard 30 min | 12.4 | 95.0 | 24.3 | 3.9 | 57.0 |
| 20 × standard 3 min** | 4.58 | 9.1 | 19.5 | 0.5 | 28.0 |
| repeat | 3.91 | 8.4 | 19.3 | 0.4 | 26.4 |
| 16 × standard 3 min** | 4.77 | 25.8 | 21.1 | 1.2 | 43.1 |
| repeat | 3.83 | 19.8 | 19.3 | 1.0 | 31.7 |
| Irradiated (2.3 kGy) | 259* | 191 | 30.3 | 6.3 | 61.2 |
| Irradiated (11.1 kGy) | 42.3* | 128 | 28.3 | 4.5 | 61.6 |
| Gelatin Table Jelly | — | 70.9 | 20.2 | 3.5 | 26.7 |

*Casson viscosity coefficient (the remaining viscosity values are Newtonian)
**For these preparations, only 100 ml of reagent solution, rather than 1 l, was used. Break Load, Elastic Limit, Gel Rigidity and Melting Point data are for gels with xanthan, 1:1 ratio degraded LBG:xanthan, 0.5% (w/w) total polysaccharide.

Enzymatic Depolymerization Procedure For Locust Bean Gum

A stock solution of LBG (PFW, Hercogum) [usually 2% w/w, but in some cases 5% was used] was prepared in distilled water by the method outlined previously. The enzyme was Gamanase 1.4L, obtained from NOVO (batch CHN 0009 90-10). It had a reported activity of 1400 kVHCU/g (viscosity hemi-cellulase units) at 20° C., pH 5.0. The enzyme was diluted into 20 mM acetate buffer pH 4.5 and added to the LBG solution (held at 60° C.) at a concentration of 400 VHCU/g LBG. After suitable incubation times (60–120 min), samples were removed and boiled for 15–20 min to inactivate the enzyme. Small samples were reserved for HPSEC analysis, whilst the remainder was recovered by precipitation with three volumes of IPA. The precipitated depolymerized material was filtered, air-dried and milled. Recoveries of all samples were recorded.

The following tables (Tables 4 and 5) show the effect of the source of xanthan and the total polysaccharide concentration on the properties of a depolymerized LBG/xanthan gel. Keltrol is presently the preferred source of xanthan due to the higher break loads of the gels.

The LBG used in the gels of Tables 4 and 5 was enzymatically depolymerized as follows. A 2% (w/w) solution of LBG (Hercogum, 20g) was treated with beta-mannanase at 400 VCHU (viscosity hemi-cellulase units)/g LBG at 60° C. for 60 minutes. The resulting depolymerized LBG had an intrinsic viscosity of 1.57 dl/g (Huggins plot) and 1.60 dl/g (Kramer plot).

Gels were prepared as follows:

For 0.5% total concentration, stock 0.5% (w/w) solutions of both xanthans (Keltrol and Rhodigel) and enzymatically depolymerized LBG (Hercogum) were prepared as described previously in 'Gel Preparation'. For preparation of mixed gels, the xanthan and LBG stock solutions were heated separately to 90°–95° C. and then mixed in the required ratio to give 100 g samples in duplicate, e.g., for 20% LBG, 20g LBG solution and 80 g xanthan were mixed in duplicate. The hot solutions were mixed thoroughly, cooled to room temperature and gelled at 10° C. for 18 hours. For 1.0% total concentration, stock 1.0% (w/w) solutions were prepared and the method followed as outlined above.

TABLE 4

(A) Depoly. LBG (Hercogum)/Xanthan (Keltrol)

| % LBG | Total Polysaccharide Concentrations (w/w) (%) | Break Load (g) | Elastic Limit (mm) | Gel Rigidity (g/mm) | Melting Point (°C.) |
|---|---|---|---|---|---|
| 20 | 0.5 | 6.4 | 20.9 | 0.31 | 19.6 (25)* |
| 40 | 0.5 | 12.5 | 13.9 | 0.91 | 28.8 |
| 50 | 0.5 | 14.6 | 14.7 | 1.00 | 31.2 (30)* |
| 60 | 0.5 | 15.4 | 14.7 | 1.05 | 32.1 |
| 80 | 0.5 | 8.7 | 15.2 | 0.58 | 33.0 (40)* |

TABLE 4-continued (A) Depoly. LBG (Hercogum)/Xanthan (Keltrol)

| % LBG | Total Polysaccharide Concentrations (w/w) (%) | Break Load (g) | Elastic Limit (mm) | Gel Rigidity (g/mm) | Melting Point (°C.) |
|---|---|---|---|---|---|
| 20 | 1.0 | 14.4 | 14.6 | 0.98 | 36.5 (27)* |
| 40 | 1.0 | 34.4 | 15.4 | 2.24 | 37.8 |
| 50 | 1.0 | 42.0 | 15.6 | 2.69 | 38.5 (30)* |
| 60 | 1.0 | 42.8 | 14.9 | 2.88 | 39.2 |
| 80 | 1.0 | 22.4 | 11.8 | 1.91 | 41.0 (45)* |

TABLE 5

(B) Depoly. LBG (Hercogum)/Xanthan (Rhodigel)

| % LBG | Total Polysaccharide Concentrations (w/w) (%) | Break Load (g) | Elastic Limit (mm) | Gel Rigidity (g/mm) | Melting Point (°C.) |
|---|---|---|---|---|---|
| 20 | 0.5 | 4.6 | 13.4 | 0.35 | 23.6 |
| 40 | 0.5 | 6.5 | 14.5 | 0.45 | 27.2 |
| 50 | 0.5 | 7.5 | 13.8 | 0.54 | 27.4 |
| 60 | 0.5 | 7.3 | 12.5 | 0.58 | 28.9 |
| 80 | 0.5 | 4.6 | 12.3 | 0.38 | 29.6 |

| 20 | 1.0 | 5.8 | 10.1 | 0.57 | 35.5 (35)* |
| 40 | 1.0 | 9.9 | 9.1 | 1.09 | 36.7 |
| 50 | 1.0 | 11.4 | 8.6 | 1.32 | 37.0 (40)* |
| 60 | 1.0 | 13.8 | 9.6 | 1.43 | 37.0 |
| 80 | 1.0 | 8.6 | 8.4 | 1.03 | 38.3 (45)* |

*From CarriMed

Table 6 shows the effect of intrinsic viscosity on gel melting point. The LBG in samples (1) and (3) was depolymerized under the same conditions as in Tables 4 and 5 whilst that in (2) was degraded for 120 minutes instead of 60 minutes. Gels were formed as in Tables 4 and 5.

TABLE 6

| Sample | Int. Vis. (dl/g) (Huggins plot) | Int. Vis. (dl/g) (Kramer plot) | Xanthan Type | Break Load (g) | Elastic Limit (mm) | Gel Rigidity (g/mm) | Melting Point (°C.) |
|---|---|---|---|---|---|---|---|
| (1) | 1.95 | 1.98 | Keltrol | 29 | 16.3 | 1.8 | 35.3 |
|  | 1.95 | 1.98 | Rhodigel | 14 | 11.9 | 1.2 | 32.7 |
| (2) | 1.35 | 1.38 | Keltrol | 11.7 | 13.9 | 0.9 | 30.3 |
|  | 1.35 | 1.38 | Rhodigel | 6.9 | 15.1 | 0.5 | 27.0 |
| (3) | 1.57 | 1.60 | Keltrol | 14.6 | 14.7 | 1.0 | 31.2 |
|  | 1.57 | 1.60 | Rhodigel | 7.5 | 13.8 | 0.5 | 27.4 |

Note:
Gel properties and melting point data are for gels (0.25/0.25%) formed from depolymerized LBG with xanthan gums.

Table 7 shows the properties of gels formed using mixtures of degraded LBG and kappa-carrageenan as gelling agent. The carrageenan used was that sold under the trade mark LITEX DANAGEL PIB. Since the presence of metal ions affects the properties of carrageenan/LBG gels in ways well-known to those skilled in the art, the effect of the addition of potassium ions (as potassium chloride) to the mixture was also studied. Viscosity data for the depolymerized LBG is shown in Table 1.

The gels were formed as follows.

Stock solutions of carrageenan and depolymerized (chemical and enzymatic) LBG (0.5 and 1% w/w) were prepared separately by hydrating in distilled water and boiling for 20 to 30 min. Hot solutions of both components were mixed together (to give the correct final total concentration) with the required concentration of potassium chloride (if present). Gels were matured at 10° C. for 18 hours and tested as described above.

TABLE 7

| LBG Source | Concentration LBG (w/w %) | Concentration Carrageenan (w/w %) | Concentration KCl (w/w %) | Break Load (g) | Elastic Unit (mm) | Gel Rigidity (g/mm) | Melting Point (°C.) |
|---|---|---|---|---|---|---|---|
| Native LBG | 0.25 | 0.25 | 0 | 77.1 | 33 | 2.34 | 31 |
| Degraded 2 × standard/3 min |  |  |  | DID NOT GEL |  |  |  |
| Native LGB | 0.5 | 0.5 | 0.3 | 806 | 12.25 | 65.79 | 66 |
| Degraded ½ × standard/30 min | 0.5 | 0.5 | 0.3 | 346 | 6 | 57.67 | 56–64 |
|  | 0.25 | 0.25 | 0.3 | 130 | 5.13 | 25.53 | 61.4 |
| Degraded standard/3 min | 0.5 | 0.5 | 0.3 | 382 | 6.34 | 59.62 | 56–64 |
| Native | 0.5 | 0.5 | 0 | 372 | 20.75 | 17.93 | 45.3 (50)* |
| Degraded ½ × standard/30 min | 0.5 | 0.5 | 0 | 40 | 13.75 | 2.91 | 36.45 (45)* |
| Degraded standard/3 min | 0.5 | 0.5 | 0 | 29.2 | 13.5 | 2.16 | 34.1 (40)* |
|  | 0.25 | 0.25 | 0.3 | 117 | 5.44 | 21.45 | 60.8 |
| Degraded 2 × standard/3 min | 0.5 | 0.5 | 0 | 17.4 | 10.25 | 10.70 | 32.6 (35)* |
|  | 0.25 | 0.25 | 0.3 | 73.6 | 4.69 | 15.73 | 59.7 |
| ENZ 5/5a+ | 0.5 | 0.5 | 0 | 19.2 | 10.50 | 1.83 | 30.9 (40)* |

*From CarriMed
+A 5% (w/w) solution of LBG (5g) was depolymerized using 400 VCHU of beta-mannanase/g LBG at 60° C. for 60 minutes. The intrinsic viscosity of the sample was 1.50 dl/g (Huggins plot).

A number of food products were prepared using a gelling agent composition comprising xanthan (from Kelco International Limited) and enzymically depolymerized LBG having a viscosity in solution at 24° C. of 4.4 mPa's in the following Examples 3 to 8.

EXAMPLE 3

Water Jelly

1. Half the required amount of water was weighed out.
2. The xanthan gum was added slowly with paddle-stirring.
3. Modified LBG was hydrated in the rest of the water with paddle-stirring.
4. Both dispersions were stirred for about 15 min, and then allowed to stand for about 2 h until apparently completely hydrated.
5. The two dispersions were mixed together, the weight recorded, and the mix was heated to 90° C. with hand-stirring.
6. The mix was re-weighed and the amount of water lost added back.
7. Sucrose, glucose syrup, flavor and color were added.
8. The mix was divided into three portions and acidified with citric acid to pH 4, 4.5 and 5, respectively.
9. The products were poured into tubs and allowed to cool slightly before lidding and placing in a refrigerator.

The following formulations (a) and (b) were used:

|  | (a) % | (b) % |
| --- | --- | --- |
| Water | 82.54 | 82.54 |
| Sucrose | 9.6 | 9.6 |
| Glucose syrup (42DE) | 6.5 | 6.5 |
| Depolymerized LBG | 0.5 | 0.6 |
| Xanthan gum | 0.5 | 0.4 |
| Pineapple flavor | 0.3 | 0.3 |
| Color | 0.06 | 0.06 |

Each formulation was acidified with 20% citric acid to three different pH levels: 4, 4.5 and 5.

As a starting point, 0.5% each of depolymerized LBG and xanthan gum were used in place of the gelatin. These jellies were found to be gummy in the mouth, which was attributed more to the xanthan than to the LBG. Hence, in the second trial, the ratio of LBG to xanthan was changed to 0.6% LBG and 0.4% xanthan. It was considered that the change in ratio would not significantly alter the gel strength but could result in a less viscous product when melted, hence reducing the gummy characteristics.

EXAMPLE 4

Milk Jelly

1. The depolymerized LBG was hydrated with paddle-stirring in half the required water.
2. The xanthan gum was hydrated in the rest of the water.
3. Both suspensions were left to stand for about 2 h.
4. They were then mixed together, and heated to about 80° C.
5. The sugar, skimmed milk powder and color were pre-mixed and stirred into the hydrated LBG and xanthan.
6. The flavor was added, and the mix was poured into tubs.
7. The gels were allowed to cool slightly at room temperature before chilling in a refrigerator.

|  | % |
| --- | --- |
| Water | 78.51 |
| Skimmed milk powder | 8.24 |
| Strawberry flavor | 0.1 |
| Color | 0.15 |
| Depolymerized LBG | 0.5 |
| Xanthan gum | 0.5 |
| Sucrose | 12.0 |

The milk jelly product was thicker than a gelatin-containing counterpart and had good mouthfeel characteristics.

EXAMPLE 5

Salad Dressing

1. The xanthan gum was hydrated in about half the required amount of water, by paddle-stirring, then left to stand for about 2 h.
2. The LBG was stirred into the rest of the water, and this then had the same standing time.
3. The two solutions were mixed, and the other dry ingredients, plus vinegar, were added.
4. The weight of the mix and pan was recorded.
5. The mix was heated with stirring to 90° C.
6. It was then cooled to below 20° C. and reweighed.
7. The water lost was calculated, and this amount of water was then stirred back into the mix.
8. The egg yolk was added gradually to the starch paste and the mix emulsified with a Silverson high-shear mixer.
9. The dressing was stored at 4° C.

The following formulations (a) and (b) were used:

|  | (a) % | (b) % |
| --- | --- | --- |
| Starch paste |  |  |
| Water | 86.1 | 81.5 |
| Purity HPC (starch) | — | 4.6 |
| Vinegar | 3.1 | 3.1 |
| Salt | 1.35 | 1.35 |
| Sucrose | 3.2 | 3.2 |
| Mustard flour | 0.1 | 0.1 |
| Potassium sorbate | 0.1 | 0.1 |
| Xanthan gum | 0.5 | 0.5 |
| Depolymerized LBG | 0.5 | 0.5 |
| Dressing |  |  |
| Starch paste | 94.95 | 94.95 |
| Egg (with 3% salt) | 5.05 | 5.05 |

In terms of flavor and mouthfeel the products were found to be very acceptable with a well-rounded flavor profile and being mouth coating with a slight creamy feel.

EXAMPLE 6

Wine Gums

1. The xanthan gum was dispersed with paddle-stirring into 110 g of water and left to stand for about 2 h.
2. The LBG was dispersed into 56.6 g of water with stirring, and left to stand for the same length of time.
3. The two mixtures were then combined, and heated to 60° C.
4. The sucrose and liquid glucose were added to the rest of the water, and this was heated to 116° C. and then cooled to 82.5° C.
5. The xanthan/LBG solution was added to the syrup with slow stirring.

6. The color and flavor were then added.

7. The batch was stored in a water bath at 76°–77° C. for 20 min, and the scum layer removed.

8. The mix, now with 68% solids, was deposited into starch moulds and allowed to stand for 3 h.

9. These were then stoved in a Calmic oven for 3 days.

10. The samples were left to stand for 8 h before brushing off and assessing.

The following formulation was used:

| | | |
|---|---|---|
| A. | Water | 166.6 g |
| | Depolymerized LBG | 1.7 g |
| | Xanthan gum | 1.7 g |
| B. | Sucrose | 270.0 g |
| | Glucose syrup (42DE) | 345.0 g |
| | Water | 75.0 g |
| | Citric acid | 4.5 g |
| | Color | 1.5 ml |
| | Flavor | 1.5 ml |

The product was found to be acceptable and to be more similar to pastilles than wine gums.

EXAMPLE 7

Chocolate Mousse

1. The xanthan and LBG were dispersed separately in two portions of the water with paddle-stirring, and left to stand for 2 h.

2. The two were then mixed together and heated to 60° C.

3. The cocoa, sugar and skimmed milk powder were dry mixed and added to the hot mixture of xanthan, LBG and water.

4. The fat was heated to 55° C.–60° C. and then added to the above mixture.

5. The weight of a fixed volume of the mix was recorded.

6. It was then transferred to a Hobart mixer and mixed for 1 min on high speed.

7. The vanillin was added, and the batch was further whipped, with samples being removed at 2 min intervals.

The over-run values of all samples were determined by weighing a fixed volume of each, and using the following equation:

$$\text{Over-run \%} = \frac{\text{wt of mix} - \text{wt of product}}{\text{wt of mix}}$$

8. Samples of product corresponding to each mixing time were poured into tubs and allowed to cool slightly before being covered and placed in a refrigerator.

The following formulation was used:

| | % |
|---|---|
| Xanthan gum | 0.50 |
| Depolymerized LBG | 0.50 |
| Cocoa powder | 4.08 |
| Sucrose | 15.40 |
| Water | 2.60 |
| Skimmed milk powder | 50.30 |
| Emulsified shortening | 26.50 |
| Vanillin | 0.12 |

The product was smooth and creamy in the mouth with good melting characteristics.

EXAMPLE 8

Low Fat Spread

1. Xanthan and LBG were dry mixed with the salt. This mix was then added slowly to the water with paddle-stirring.

2. After mixing for about 15 min, this aqueous phase was heated to 80° C. with stirring, and then cooled to about 50° C.

3. Color and aqueous phase flavor were added.

4. The fat was weighted into a separate vessel. A portion of the fat was removed and the emulsifier dissolved in it, and then added back into the rest of the oil.

5. The fat phase was heated to 50° C., and the fat-soluble flavor was then added to it.

6. The aqueous phase was pumped into the fat at a rate of roughly 1 l/min with mixing with a high-shear mixer. The speed of the high-shear mixer was increased throughout emulsification starting at 1,5000 rev/min, and increasing at 5-min intervals to 1,800, 2,000, 2,250 and 2,400 rev/min, respectively. The final speed was maintained until all the aqueous phase had been added.

7. The emulsion was then pumped through a Schröder Kombinator pilot plant. Initially, the product was cooled in a scraped-surface heat exchanger. It then passed into a worker unit and was collected. The conditions varied in order to obtain optimal products were:
throughput speed
speed of scrapers in cooling unit
worker speed
temperature on exit from scraped-surface chiller.

The following formulation was used:

| | % |
|---|---|
| Aqueous phase | |
| Water | 58.74 |
| Salt | 0.6 |
| Depolymerized LBG | 0.3 |
| Xanthan gum | 0.3 |
| Flavor | 0.02 |
| Color | 0.04 |
| Fat phase | |
| Fat | |
| Dimodan OT (distilled | 39.365 |
| monoglycerides) | 0.6 |
| Flavor | 0.035 |

The spread was oil-continuous in nature and acceptable in terms of appearance, mouthfeel and melting properties.

What is claimed is:

1. A gelling agent composition comprising depolymerized locust bean gum having an intrinsic viscosity of from 1.3 to 2.3 dl/g and a polysaccharide or mixture of polysaccharides that forms a gel in aqueous solution with locust bean gum.

2. A gelling agent composition as claimed in claim 1, wherein the polysaccharide is xanthan gum.

3. A gelling agent composition as claimed in claim 1, wherein the polysaccharide is kappa-carrageenan.

4. A gelling agent composition as claimed in claim 1, wherein the weight ratio of depolymerized locust bean gum to polysaccharide is from 4:1 to 1:4.

5. A gelling agent composition as claimed in claim 1, wherein the weight ratio of depolymerized locust bean gum to polysaccharide is from 2:1 to 1:2.

6. A method of producing a gelling agent composition comprising the steps of:

(i) depolymerizing locust bean gum to reduce the intrinsic viscosity to from 1.3 to 2.3 dl/g; and (ii) adding the depolymerized locust bean gum of step (i) to a polysaccharide or mixture of polysaccharides that forms a gel in aqueous solution with locust bean gum.

7. A method as claimed in claim 6, wherein step (i) is effected enzymatically.

8. A method as claimed in claim 6, wherein step (i) is effected by a chemical or physical polymer cleavage reaction.

9. A comestible product comprising the gelling agent composition of claim 1.

10. A comestible product as claimed in claim 9, wherein the gelling agent composition is present at a concentration of from 0.3 to 1.3% by weight.

11. A comestible product as claimed in claim 9, wherein the foodstuff is gelled and the gel melts at-from 10° to 45° C.

* * * * *